A. S. TERHAAR.
MOTOR CYCLE FRAME.
APPLICATION FILED MAR. 23, 1914.
1,130,038.
Patented Mar. 2, 1915.
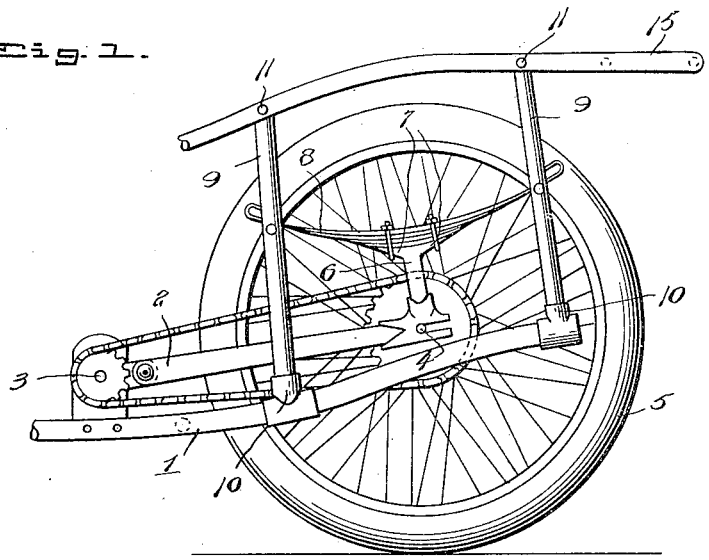
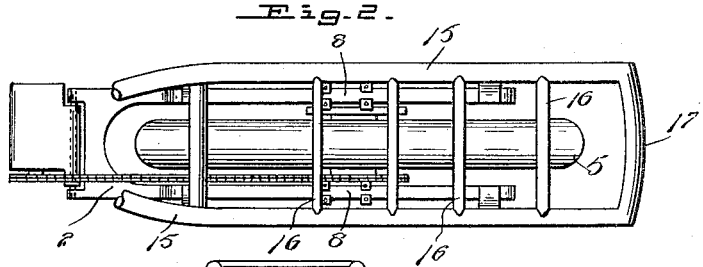
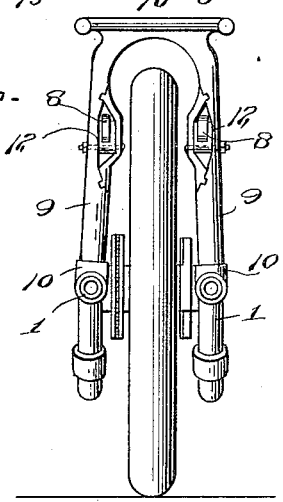
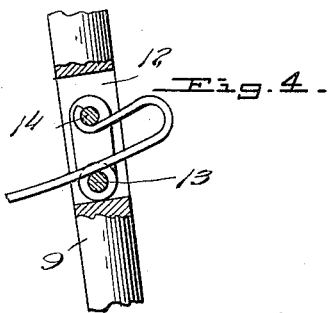
Witnesses
Inventor
A. S. Terhaar
By
Attorneys

UNITED STATES PATENT OFFICE.

ALOYSIUS S. TERHAAR, OF SAN DIEGO, CALIFORNIA.

MOTOR-CYCLE FRAME.

1,130,038.

Specification of Letters Patent.

Patented Mar. 2, 1915.

Application filed March 23, 1914. Serial No. 826,742.

*To all whom it may concern:*

Be it known that I, ALOYSIUS S. TERHAAR, a citizen of the United States, residing at San Diego, in the county of San Diego, State of California, have invented certain new and useful Improvements in Motor-Cycle Frames; and I do hereby declare the following to be a full, clear, and exact description of the invention, such as will enable others skilled in the art to which it appertains to make and use the same.

This invention relates to motorcycles, and more particularly to the baggage carrier, and to the mounting of the rear portion of the frame on the wheel.

The object of the invention is to provide a baggage carrier which will be yieldably supported, and thus all sudden shocks to the baggage will be overcome.

A further object of the invention is to provide for the yieldably mounting of the rear portion of the frame of the motorcycle on the wheel.

With these and other objects in view, the invention consists in the arrangement and combination of parts as herein set forth.

In the drawing: Figure 1 is a side elevation of my improvement applied to a motorcycle. Fig. 2 is a top plan view of my baggage rack. Fig. 3 is a rear elevation of the same. Fig. 4 is a detail showing the manner of mounting the spring on the baggage rack supporting members.

Referring to the drawing by reference characters wherein like characters represent like parts in the several views: On the frame 1 of the motorcycle on each side of the rear wheel a distance rod 2 is provided and extends from the driving shaft of the gear wheel 3 to the axle 4 of the rear wheel 5. Formed on the rear end of this member 2 is an upwardly extending arm 6 having outwardly diverging projections 7. Secured to these projections and extending outwardly therefrom is a laminated spring 8. The ends of this spring are secured to the uprights 9—9 which in turn are attached to the frame 1 at 10—10 and support the baggage carrier by virtue of their connection therewith at 11—11. As shown in Fig. 3 the members 9—9 are bifurcated at 12—12. Each end of the spring is extended into one of these bifurcations and secured therein in such manner as shown in Fig. 4, that is by passing the end of the spring above the pin 13 and bending the spring back upon itself and extending the same beneath the pin 14. The baggage carrier comprises spaced bars 15—15 connected by cross bars 16 and end bar 17. It is to be understood by this construction that the side bars and cross bars lie in the same plane, thus providing a smooth surface on which to carry the baggage.

From the foregoing it may be seen that I have provided means whereby the rear portion of the motorcycle frame will be yieldably mounted upon the wheel, and I have further provided a baggage carrier which is mounted on the frame and yieldably supported to prevent sudden shock to the load.

I do not wish to be limited to the particular construction set forth, but only so far as is necessary by the claims.

What is claimed is:—

1. In a motorcycle, an arm supported by the rear wheel thereof, a spring attached to the upper end of said arm, and downwardly extending arms attached to the ends of the said spring for supporting the lower portion of the motorcycle frame.

2. A motorcycle frame comprising lower supporting bars, members extending upwardly therefrom, a baggage rack supported by said upwardly extending members, and springs adapted to be attached to the axle of a rear wheel of a motorcycle at points midway between their ends, the ends of the springs being attached to the upwardly extending members and yieldingly supporting the same.

3. In a motorcycle, a frame, a baggage carrier integral with said frame, means for yieldably supporting said baggage carrier and frame upon the rear wheel of the motorcycle.

4. In a motorcycle, a frame comprising lower supporting members, distance rods carried thereby and adapted to be attached to the rear axle of a motorcycle, arms attached to the rear ends of said distance rods and extending upwardly therefrom, springs on the upper ends of said arms, upwardly extending supporting members carried by the lower supporting members of the frame, a baggage carrier supported by said upwardly extending members, and means for attaching the ends of said springs to the last mentioned members for yieldably supporting the baggage rack and frame.

In testimony whereof, I affix my signature, in the presence of two witnesses.

ALOYSIUS S. TERHAAR.

Witnesses:
 ROSA LEE JOHNSON,
 ROBERT R. HAMILTON.

Copies of this patent may be obtained for five cents each, by addressing the "Commissioner of Patents, Washington, D. C."